(12) United States Patent
Deng et al.

(10) Patent No.: US 11,105,461 B2
(45) Date of Patent: Aug. 31, 2021

(54) ASSEMBLED SUPPORT FOR INSTALLING COMMUNICATIONS DEVICE AND STRUCTURE COMBINING ASSEMBLED SUPPORT AND COMMUNICATIONS DEVICE

(71) Applicant: HUAWEI TECHNOLOGIES CO., LTD., Guangdong (CN)

(72) Inventors: Shunqing Deng, Shenzhen (CN); Yang Lai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 46 days.

(21) Appl. No.: 16/298,320

(22) Filed: Mar. 11, 2019

(65) Prior Publication Data
US 2019/0203878 A1 Jul. 4, 2019

Related U.S. Application Data

(63) Continuation of application No. PCT/CN2017/086610, filed on May 31, 2017.

(30) Foreign Application Priority Data

Sep. 12, 2016 (CN) .......................... 201610821201.7

(51) Int. Cl.
*F16M 13/00* (2006.01)
*F16M 13/02* (2006.01)
(Continued)

(52) U.S. Cl.
CPC ........ *F16M 13/022* (2013.01); *F16M 11/041* (2013.01); *F16M 13/02* (2013.01); *H01Q 1/1228* (2013.01); *H04B 1/38* (2013.01)

(58) Field of Classification Search
CPC .................................................. F16M 13/022
(Continued)

(56) References Cited

U.S. PATENT DOCUMENTS 5,971,345 A 10/1999 Khalaf
8,015,767 B2 * 9/2011 Glick .................... E04B 2/7407
52/239

(Continued)

FOREIGN PATENT DOCUMENTS

CN 101271995 A 9/2008
CN 201540390 U 8/2010
(Continued)

OTHER PUBLICATIONS

Chinese Office Action issued in Chinese Application No. 201610821201.7 dated Jan. 23, 2019, 7 pages.
(Continued)

*Primary Examiner* — Steven M Marsh
(74) *Attorney, Agent, or Firm* — Fish & Richardson P.C.

(57) ABSTRACT

Embodiments of the present disclosure provide example assembled supports for installing a communications device and structures combining a communications device and an assembled support, and relate to the field of communications device installation technologies. In one example, the assembled support for installing a communications device includes a mounting bracket and multiple assembled fasteners. At least one of the assembled fasteners is connected to the mounting bracket. The assembled fastener has a prismatic structure and is disposed in a vertical direction. The assembled fastener includes two under faces and multiple side faces, a jointing structure is disposed on at least one side face of the assembled fastener, and at least one side face of the assembled fastener is used to install the communications device.

23 Claims, 11 Drawing Sheets

(51) Int. Cl.
*H01Q 1/12* (2006.01)
*F16M 11/04* (2006.01)
*H04B 1/38* (2015.01)

(58) Field of Classification Search
USPC ..... 248/227.3, 230.1, 230.5, 225.11, 220.21, 248/220.22
See application file for complete search history.

(56) References Cited

U.S. PATENT DOCUMENTS

| | | | | |
|---|---|---|---|---|
| 8,191,840 | B2* | 6/2012 | Jenestreet | F16B 12/42 248/218.4 |
| 10,656,502 | B1* | 5/2020 | Sandoval | H04N 5/2253 |
| 2004/0155161 | A1* | 8/2004 | Yeh | E05D 5/0246 248/220.22 |
| 2006/0278783 | A1* | 12/2006 | Rubin | G09F 7/18 248/230.1 |
| 2013/0048811 | A1* | 2/2013 | Tseng | F16M 13/02 248/220.21 |

FOREIGN PATENT DOCUMENTS

| | | |
|---|---|---|
| CN | 102088799 A | 6/2011 |
| CN | 203375125 U | 1/2014 |
| CN | 204717296 U | 10/2015 |
| CN | 205402172 U | 7/2016 |
| CN | 205560200 U | 9/2016 |
| EP | 2309832 A1 | 4/2011 |
| JP | 2005086393 A | 3/2005 |
| KR | 20130121333 A | 11/2013 |

OTHER PUBLICATIONS

International Search Report and Written Opinion issued in International Application issued in International Application No. PCT/CN2017/086610 dated Sep. 1, 2017, 18 pages.

Extended European Search Report issued in European Application No. 17847954.9 dated Jul. 16, 2019, 7 pages.

* cited by examiner

ASSEMBLED SUPPORT FOR INSTALLING COMMUNICATIONS DEVICE AND STRUCTURE COMBINING ASSEMBLED SUPPORT AND COMMUNICATIONS DEVICE

CROSS-REFERENCE TO RELATED APPLICATIONS

This application is a continuation of International Application No. PCT/CN2017/086610, filed on May 31, 2017, which claims priority to Chinese Patent Application No. 201610821201.7, filed on Sep. 12, 2016. The disclosures of the aforementioned applications are hereby incorporated by reference in their entireties.

TECHNICAL FIELD

The present invention relates to the field of communications device installation technologies, and in particular, to an assembled support for installing a communications device and a structure combining the assembled support and the communications device.

BACKGROUND

Because an RRU (Radio Remote Unit, radio remote unit) module does not amplify noise when amplifying a signal, the RRU module is usually used as a communications device in a densely populated place such as a residential community. To ensure security and stability of the RRU module in use, the RRU module is usually installed on a relatively high position such as a pole, a wall, or a signal tower.

In the prior art, the RRU module is usually installed on a pole by using a pole mounting kit and a bracket. As shown in FIG. 1, a pole mounting kit 01 is first fastened on a pole 02, then a bracket 03 is fastened on the pole mounting kit 01, and finally, an RRU module 04 is inserted into the bracket 03. In this way, the RRU module 04 is installed on the pole 02.

However, as more communications devices are installed in a centralized manner in multiple sectors and multiple frequency bands, this function cannot be implemented if only one RRU module is installed. Therefore, normal usage by a user is seriously affected. In addition, a manner of separately installing RRU modules on different installation positions in a same area brings much inconvenience to unified management and function division of the RRU modules, and a workload is relatively heavy when a technical personnel performs maintenance.

SUMMARY

Embodiments of the present invention provide an assembled support for installing a communications device, and the assembled support can be used to install one or more communications devices on a same installation position.

To achieve the foregoing objective, according to a first aspect, an embodiment of the present invention provides an assembled support for installing a communications device, including a mounting bracket and multiple assembled fasteners. A least one assembled fastener is connected to the mounting bracket. The assembled fastener has a prismatic structure and is disposed in a vertical direction. The assembled fastener includes two under faces and multiple side faces, a jointing structure is disposed on at least one side face of the assembled fastener, and at least one side face of the assembled fastener is used to install the communications device. The multiple assembled fasteners are jointed together by using the jointing structure.

Compared with the prior art, according to the assembled support for installing a communications device provided in this embodiment of the present invention, at least one assembled fastener is connected to the mounting bracket, and a remaining assembled fastener is jointed, by using the jointing structure, to the assembled fastener connected to the mounting bracket. Therefore, the assembled fastener is connected to an installation position of the communications device by using the mounting bracket. The installation position of the communications device is a position that is of a specific height and that is used to install the communications device, such as a wall, a signal tower, or a pole. After the assembled support is installed on the installation position of the communications device, the communications device is installed on the assembled fastener. At least one side face of each assembled fastener is used to install the communications device. Therefore, according to an actual requirement, one or more communications devices may be selected for installation on the assembled support that is installed on an installation position, to meet different installation requirements on the communications device. In addition, to meet a requirement of installing communications devices in a centralized manner in multiple sectors and multiple frequency bands, multiple communications devices are installed on a same installation position, thereby facilitating management and maintenance by a worker.

With reference to the first aspect, in a first possible implementation, a jointing structure is disposed on a side face used to install the communications device, and the jointing structure is configured to install the communications device. After a connection structure that is on the assembled fastener and that is configured to connect to the communications device is disposed as a jointing structure, technological difficulty in a mold production process of the assembled fastener is greatly lowered, thereby simplifying a structure of the assembled fastener and reducing production costs of the assembled fastener. In addition, because the communications device is jointed to the assembled fastener by using the jointing structure, assembling/disassembling between the communications device and the assembled fastener is relatively simple, thereby reducing a time of working at heights by a worker.

With reference to the first possible implementation of the first aspect, in a second possible implementation, there are two assembled fasteners, the two assembled fasteners are jointed together by using a jointing structure on a side face, and jointing structures on the remaining side faces are configured to install the communications device.

With reference to the first possible implementation of the first aspect, in a third possible implementation, there are three assembled fasteners, two neighboring assembled fasteners are jointed together by using a jointing structure on a side face, and jointing structures on the remaining side faces are configured to install the communications device.

With reference to the first possible implementation of the first aspect, in a fourth possible implementation, the jointing structure is an insertion block or an insertion slot, and the insertion block and the insertion slot are disposed to extend in a same direction; the insertion slot includes two side walls oppositely disposed in an extension direction of the insertion slot, the two side walls respectively form an open end and a bottom end respectively on two ends in the extension direction of the insertion slot, the insertion slot further includes flanges, the flanges are side edges extending outward from the two oppositely disposed side walls in the extension direction, and the flanges extend into the insertion slot; and the insertion block includes a mating portion and a connection plate connected between the assembled fastener and the mating portion, and both sides of the mating portion in a width direction protrude beyond the connection plate. When the jointing structure is disposed as an insertion block and an insertion slot, to joint multiple assembled fasteners together, the jointing can be completed simply by inserting an insertion block on one assembled fastener into an insertion slot on another assembled fastener. Assembling is quick and convenient.

With reference to the fourth possible implementation of the first aspect, in a fifth possible implementation, a mating portion of one of two neighboring assembled fasteners is inserted into an insertion slot of the other assembled fastener from an open end of the insertion slot, and the mating portion abuts against two oppositely disposed side walls and flanges after an insertion block is inserted into the insertion slot, to prevent the insertion block from sliding out of the insertion slot. The two oppositely disposed side walls of the insertion slot form the open end at an end in the extension direction of the insertion slot, so that the insertion block can be successfully inserted into the insertion slot from the open end of the insertion slot, and abut against the side walls of the insertion slot. In addition, the mating portion of the insertion block abuts against the flanges, so that the insertion block cannot slide out of the insertion slot. Therefore, to remove the insertion block from the insertion slot, the worker can remove the insertion block only in a direction opposite to an insertion direction of the insertion block, thereby effectively ensuring stable jointing between the two assembled fasteners.

With reference to the fourth possible implementation of the first aspect, in a sixth possible implementation, a jointing structure is disposed on the communications device, a mating portion of either of the assembled fastener and the communications device is inserted into an insertion slot from an open end of the insertion slot of the other one, and the mating portion abuts against two oppositely disposed side walls and flanges after an insertion block is inserted into the insertion slot, to prevent the insertion block from sliding out of the insertion slot.

With reference to the fourth possible implementation of the first aspect, in a seventh possible implementation, a width of the mating portion from a first end to a second end in a direction of insertion into the insertion slot gradually decreases, after the insertion block is inserted into the insertion slot, the first end is disposed close to the open end of the insertion slot, and a width of a most narrow part of the insertion slot is less than a width of a widest part of the mating portion inserted into the insertion slot.

With reference to the fourth possible implementation of the first aspect, in an eighth possible implementation, a distance between the two oppositely disposed side walls of the insertion slot at the open end is greater than a distance between the two oppositely disposed side walls at the other end. When the distance between the two oppositely disposed side walls of the insertion slot at the open end is relatively large, that is, a width of the insertion slot at the open end is relatively large, the insertion block can be more easily inserted into the insertion slot. When the distance between the two oppositely disposed side walls at the other end that is away from the open end is relatively small, that is, a width of the insertion slot at the other end in the extension direction of the insertion slot is relatively small, the insertion block inserted into the insertion slot can abut against the side walls of the insertion slot, and a contact area between the insertion slot and the insertion block increases, so that the jointing is more stable.

With reference to the fourth possible implementation of the first aspect, in a ninth possible implementation, the open end of the insertion slot passes through the under face.

With reference to the fourth possible implementation of the first aspect, in a tenth possible implementation, the bottom end of the insertion slot in the extension direction of the insertion slot is an opening.

With reference to the fourth possible implementation of the first aspect, in an eleventh possible implementation, the bottom end of the insertion slot in the extension direction of the insertion slot is an opening and passes through the under face.

With reference to the fourth possible implementation of the first aspect, in a twelfth possible implementation, an end of the two oppositely disposed side walls in the extension direction of the insertion slot is the open end, and the other end is a closed end.

With reference to the fourth possible implementation of the first aspect, in a thirteenth possible implementation, at least one insertion block and at least one insertion slot are disposed on a side face of each assembled fastener; and on a same assembled fastener, a width of the mating portion from a first end to a second end in a direction of insertion into the insertion slot gradually decreases, the first end is disposed close to the open end of the insertion slot, and a minimum width of the insertion slot is less than a maximum width of the mating portion inserted into the insertion slot. On a same assembled fastener, the first end that is of the mating portion and that has a relatively large width is disposed close to the open end of the insertion slot. When two identical assembled fasteners are being jointed, the second end that is of the mating portion and that has a relatively small width is inserted from the open end of the insertion slot. After the insertion block is completely inserted into the insertion slot, the first end of the insertion block is close to the open end of the insertion slot. In this case, first ends of all insertion blocks on a formed assembled fastener group are all disposed close to the open end of the insertion slot, so that an additional assembled fastener can be continuously jointed, and multiple assembled fasteners are jointed together. Therefore, multiple communications devices are jointed together.

With reference to the seventh possible implementation of the first aspect, in a fourteenth possible implementation, the first end is an upper end of the mating portion, the second end is a lower end of the mating portion, and the insertion block is inserted into the insertion slot in a down-to-up direction.

With reference to the fourteenth possible implementation of the first aspect, in a fifteenth possible implementation, the mating portion is a trapezoidal plate, and a bottom of the trapezoidal plate is the first end of the insertion block.

With reference to the thirteenth possible implementation of the first aspect, in a sixteenth possible implementation, a width of the mating portion is uniform.

With reference to the sixteenth possible implementation of the first aspect, in a seventeenth possible implementation, the mating portion includes two cylindrical connection portions, and an axis of a cylindrical connection portion is parallel to an extension direction of the insertion block.

With reference to the fourth possible implementation of the first aspect, in an eighteenth possible implementation, a jointing structure on one side face of the assembled fastener is an insertion slot, and jointing structures on the remaining side faces are insertion blocks. When an assembled fastener with such a structure is used for jointing, the jointing can be completed by correspondingly inserting an insertion block of one assembled fastener into an insertion slot of another assembled fastener. A jointing speed is relatively high, so that quick jointing can be implemented.

With reference to the fourth possible implementation of the first aspect, in a nineteenth possible implementation, a jointing structure on one side face of the assembled fastener is an insertion block, and jointing structures on the remaining side faces are insertion slots. When an assembled fastener with such a structure is used for jointing, the jointing can be completed by correspondingly inserting an insertion block of one assembled fastener into an insertion slot of another assembled fastener. A jointing speed is relatively high, so that quick jointing can be implemented.

With reference to the fourth possible implementation of the first aspect, in a twentieth possible implementation, jointing structures on two side faces of the assembled fastener are insertion slots, jointing structures on the remaining side faces are insertion blocks, a transfer block is detachably connected to one of the insertion slots, and a part that is outside the insertion slot and that is of the transfer block forms the insertion block. When an assembled fastener with such a structure is used for jointing, the jointing can be completed by inserting an insertion block of one assembled fastener into an insertion slot in which no transfer block is disposed. In addition, an orientation of the transfer block on the assembled fastener may be changed according to an actual assembling requirement, so that a first end that is of the insertion block formed on the transfer block and that is away from a side of a main body is disposed close to or away from an open end of the insertion slot, to ensure that another assembled fastener can be continuously jointed to an assembled fastener that is jointed to the transfer block.

With reference to the first possible implementation of the first aspect, in a twenty-first possible implementation, the assembled fastener has a regular quadrangular structure.

With reference to the twenty-first possible implementation of the first aspect, in a twenty-second possible implementation, jointing structures on two neighboring side faces of the assembled fastener are insertion slots, and jointing structures on the other two side faces are insertion blocks.

With reference to the twenty-first possible implementation of the first aspect, in a twenty-third possible implementation, jointing structures on two oppositely disposed side faces of the assembled fastener are insertion slots, and jointing structures on the other two oppositely disposed side faces are insertion blocks.

With reference to the twenty-first possible implementation of the first aspect, in a twenty-fourth possible implementation, a fastening member is disposed on the to-be-installed communications device, a jointing structure is disposed on a side that is of the fastening member and that is away from the to-be-installed communications device, and the jointing structure on the fastening member is capable of coordinating with the jointing structure on the assembled fastener for jointing.

With reference to the first aspect, in a twenty-fifth possible implementation, an installation position of the communications device is on a pole, the mounting bracket includes a primary fastener and a secondary fastener that are disposed on two sides of the pole, and the primary fastener and the secondary fastener are connected to each other by using a stay bolt, so that the primary fastener and the secondary fastener are fastened to the pole.

With reference to the first aspect, in a twenty-sixth possible implementation, an installation position of the communications device is on an installation wall, a bolt hole is disposed on the mounting bracket, and a bolt passes through the bolt hole to fasten the mounting bracket to the installation wall.

According to a second aspect, an embodiment of the present invention further provides a structure combining a communications device and an assembled support, including the foregoing assembled support and multiple communications devices jointed to the assembled support. The assembled support is installed on a communications device installation position by using a mounting bracket.

With reference to the second aspect, in a twenty-seventh possible implementation, multiple assembled supports are arranged in a height direction of the communications device installation position, and multiple communications devices are jointed to each assembled support.

With reference to the second aspect, in a twenty-eighth possible implementation, there are two jointing structures configured to joint with another assembled fastener on each assembled fastener, the two jointing structures are respectively on two opposite side faces of the assembled fastener, and multiple assembled fasteners are jointed into a line in a horizontal direction by means of coordination.

With reference to the twenty-eighth possible implementation of the second aspect, in a twenty-ninth possible implementation, all the multiple communications devices are jointed to a side that is of the assembled fastener and that is away from the mounting bracket, and end faces on sides that are of the multiple communications devices and that are away from the mounting bracket are flush with one another.

With reference to the twenty-eighth possible implementation of the second aspect, in a thirtieth possible implementation, a communications device is jointed to each jointing structure that is on the assembled fastener and that is neither jointed to another assembled fastener nor connected to the mounting bracket.

BRIEF DESCRIPTION OF DRAWINGS

The following briefly describes accompanying drawings that need to be used in embodiments or the prior art.

DESCRIPTION OF EMBODIMENTS

Figure 1:
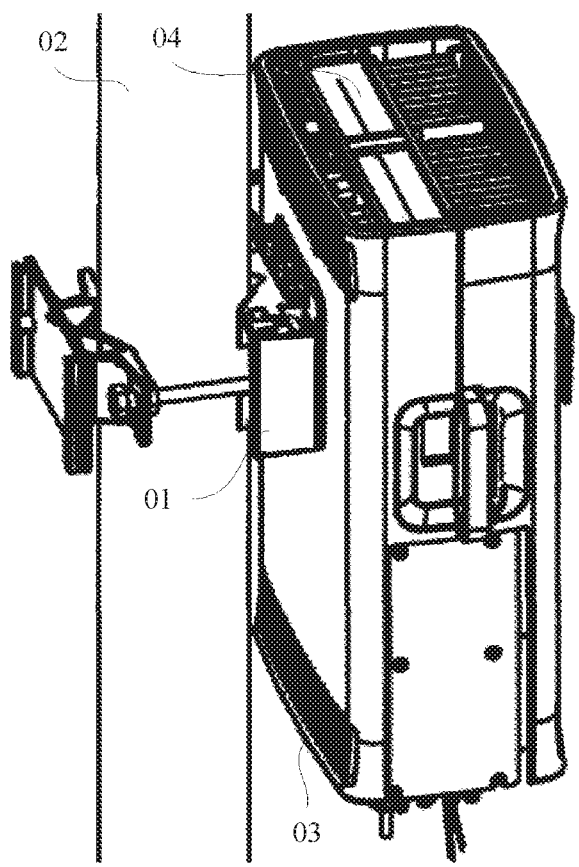
FIG. 1 is a schematic structural diagram of using multiple mounting kits for jointing in the prior art.

The following describes the technical solutions in the embodiments of this application with reference to the accompanying drawings in the embodiments of this application.

In the descriptions of this application, directions or position relationships indicated by terms "center", "up", "down", "front", "behind", "left", "right", "vertical", "horizontal", "top", "bottom", "inside", "outside", and the like are based on directions or position relationships shown by the accompanying drawings, and are merely used for describing this application and for description simplicity, instead of indicating or implying that an indicated apparatus or element need to provide in a specific orientation or need to be constructed and operated in a specific orientation. Therefore, this shall not be understood as a limitation on this application.

The terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more such features. In the descriptions of the present invention, "multiple" means two or more than two, unless otherwise specified.

In the descriptions of the present invention, it should be noted that terms "installation" "joint", and "connection" should be understood in a broad sense unless otherwise explicitly specified or limited. For example, "connection" may be a fixed connection, a detachable connection, or an integrated connection; may be a mechanical connection; or may be a direct connection, an indirect connection based on an intermediate medium, or an internal connection between two elements. For a person of ordinary skill in the art, a specific meaning of the foregoing terms in the present invention may be understood according to a specific situation.

A signal can be enhanced and a coverage area of the signal can be increased by jointing multiple communications devices, to meet a requirement for higher-quality signal transmission and a requirement for a larger signal coverage area.

FIG. 2 to FIG. 5 show a system architecture of an assembled support that is used to install a communications device and that is applied to an embodiment of the present invention. The assembled support includes a mounting bracket 1 and multiple assembled fasteners 2. At least one of the assembled fasteners 2 is connected to the mounting bracket 1. The assembled fastener 2 has a prismatic structure and is disposed in a vertical direction. The assembled fastener 2 includes two under faces 25 and multiple side faces 21, a jointing structure is disposed on at least one side face 21 of the assembled fastener 2, and at least one side face 21 of the assembled fastener 2 is used to install the communications device 3. The multiple assembled fasteners 2 are jointed together by using the jointing structure.

Compared with the prior art, according to the assembled support for installing a communications device provided in this embodiment of the present invention, at least one assembled fastener 2 is connected to the mounting bracket 1, and a remaining assembled fastener 2 is jointed, by using the jointing structure, to the assembled fastener 2 connected to the mounting bracket 1. Therefore, the assembled fastener 2 is connected to an installation position of the communications device by using the mounting bracket 1. The installation position of the communications device is a position that is of a specific height and that is used to install the communications device, such as a wall, a signal tower, or a pole. After the assembled support is installed on the installation position of the communications device, the communications device 3 is installed on the assembled fastener. At least one side face 21 of each assembled fastener 2 is used to install the communications device 3. Therefore, according to an actual requirement, one or more communications devices 3 may be selected for installation on the assembled support that is installed on an installation position, to meet different installation requirements on the communications device 3. In addition, to meet a requirement of installing communications devices 3 in a centralized manner in multiple sectors and multiple frequency bands, multiple communications devices 3 are installed on a same installation position, thereby facilitating management and maintenance by a worker.

To simplify a structure of the assembled fastener 2 and lower difficulty in connecting the assembled fastener 2 and the communications device 3, as shown in FIG. 3 to FIG. 6, a jointing structure is disposed on a side face 21 used to install the communications device 3, and the jointing structure is configured to install the communications device 3. After a connection structure that is on the assembled fastener 2 and that is configured to connect to the communications device 3 is disposed as a jointing structure, technological difficulty in a mold production process of the assembled fastener 2 is greatly lowered, thereby simplifying a structure of the assembled fastener 2 and reducing production costs of the assembled fastener 2. In addition, because the communications device 3 is jointed to the assembled fastener 2 by using the jointing structure, assembling/disassembling between the communications device 3 and the assembled fastener 2 is relatively simple, thereby reducing a time of working at heights by a worker.

Figure 7:
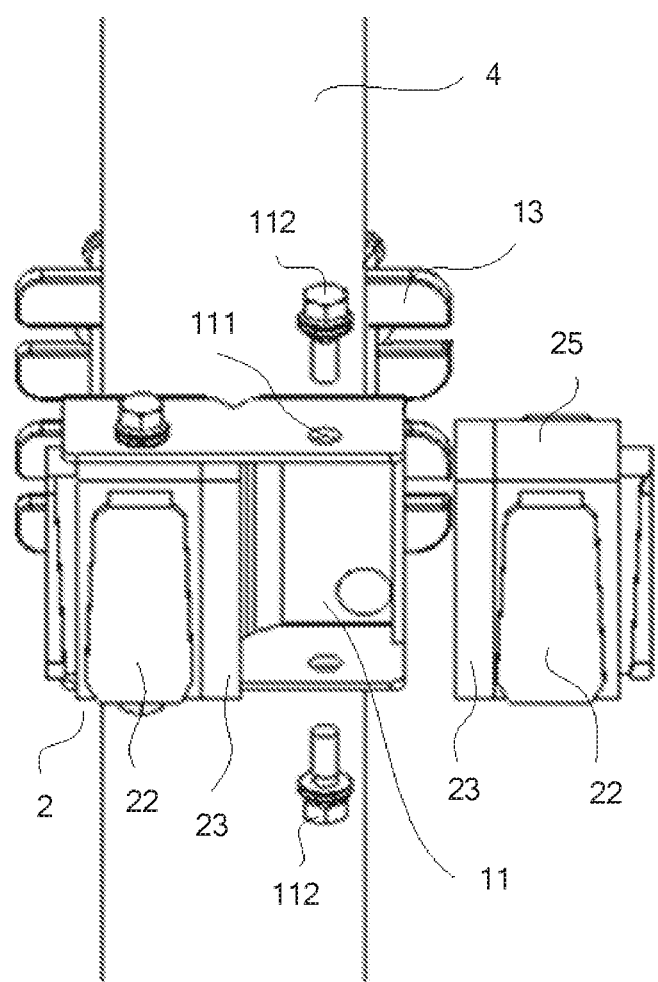
FIG. 7 is a schematic diagram of a jointing solution of a first implementation of an assembled fastener of an assembled support for installing a communications device according to an embodiment of the present invention.

For example, to implement a structure for jointing multiple communications devices 3, as shown in FIG. 7, the assembled support includes two assembled fasteners 2, the two assembled fasteners 2 are jointed together by using a jointing structure on a side face 21, and jointing structures on the remaining side faces 21 are configured to install the communications device 3.

Figure 8:
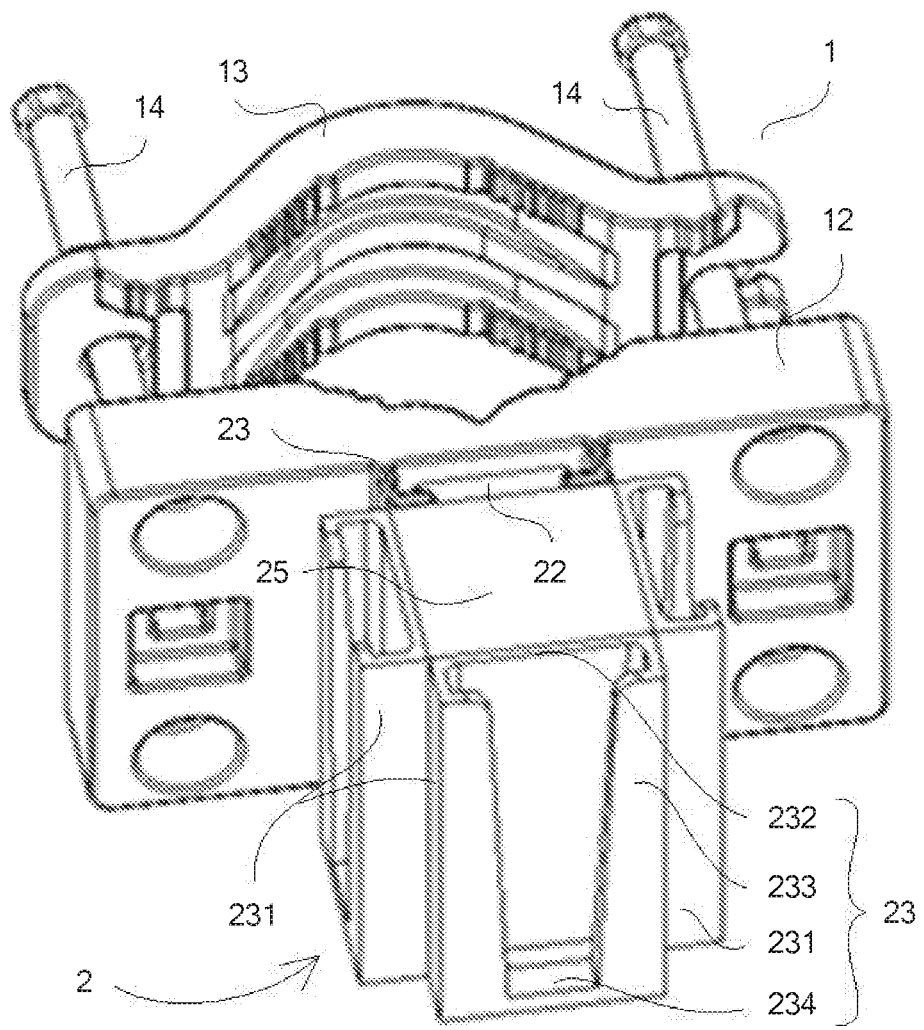
FIG. 8 is a schematic diagram of a jointing solution of a second implementation of an assembled fastener of an assembled support for installing a communications device according to an embodiment of the present invention.

For example, alternatively, a structure for jointing multiple communications devices 3 may be formed by jointing three assembled fasteners 2. As shown in FIG. 8, the assembled support includes three assembled fasteners 2, two neighboring assembled fasteners 2 are jointed together by using a jointing structure on a side face 21, and jointing structures on the remaining side faces 21 are configured to install the communications device 3.

Because the communications device 3 is usually installed on a position of a specific height, such as a pole, a wall, or a signal tower, in addition to ensuring installation stability of the communications device 3, it should be ensured that the communications device 3 can be quickly assembled/disassembled, so that a worker does not need to work at heights for a long time, thereby reducing dangerous level in work. Therefore, as shown in FIG. 3 to FIG. 6, the jointing structure is disposed as an insertion block 22 or an insertion slot 23. The insertion block 22 and the insertion slot 23 are disposed to extend in a same direction. The insertion slot 23 includes two side walls 231 oppositely disposed in an extension direction of the insertion slot 23, and the two side walls 231 form an open end 232 at an end in the extension direction of the insertion slot 23. The insertion slot 23 further includes flanges 233, and the flanges 233 are side edges extending from the two oppositely disposed side walls 231 into the insertion slot. The insertion block 22 includes a mating portion 221 and a connection plate 222 connected between the assembled fastener 2 and the mating portion 221, and both sides of the mating portion 221 in a width direction protrude beyond the connection plate 222. When the jointing structure is disposed as the insertion block 22 and the insertion slot 23, to joint multiple assembled fasteners 2 together, the jointing can be completed simply by inserting an insertion block 22 on one assembled fastener 2 into an insertion slot 23 on another assembled fastener 2. Assembling is quick and convenient.

As shown in FIG. 3 to FIG. 6, when the insertion block 22 is being inserted into the insertion slot 23, a mating portion 221 of one of two neighboring assembled fasteners 2 is inserted into an insertion slot of the other assembled fastener 2 from an open end 232 of the insertion slot 23, and the mating portion 221 abuts against two oppositely disposed side walls 231 and flanges 233 after an insertion block 22 is inserted into the insertion slot 23, to prevent the insertion block 22 from sliding out of the insertion slot 23. The two oppositely disposed side walls 231 of the insertion slot 23 form the open end 232 at an end in the extension direction of the insertion slot 23, so that the insertion block 22 can be successfully inserted into the insertion slot 23 from the open end 232 of the insertion slot 23, and abut against the side walls of the insertion slot 23. In addition, the mating portion 221 of the insertion block 22 abuts against the flanges 233, so that the insertion block 22 cannot slide out of the insertion slot. Therefore, to remove the insertion block 22 from the insertion slot 23, the worker can remove the insertion block 22 only in a direction opposite to an insertion direction of the insertion block 22, thereby effectively ensuring stable jointing between the two assembled fasteners 2.

Preferably, the mating portion 221 and the connection plate 222 are integrally formed, to increase strength of the insertion block 22, and avoid a jointing failure caused by detachment between the mating portion 221 and the connection plate 222.

Figure 2:
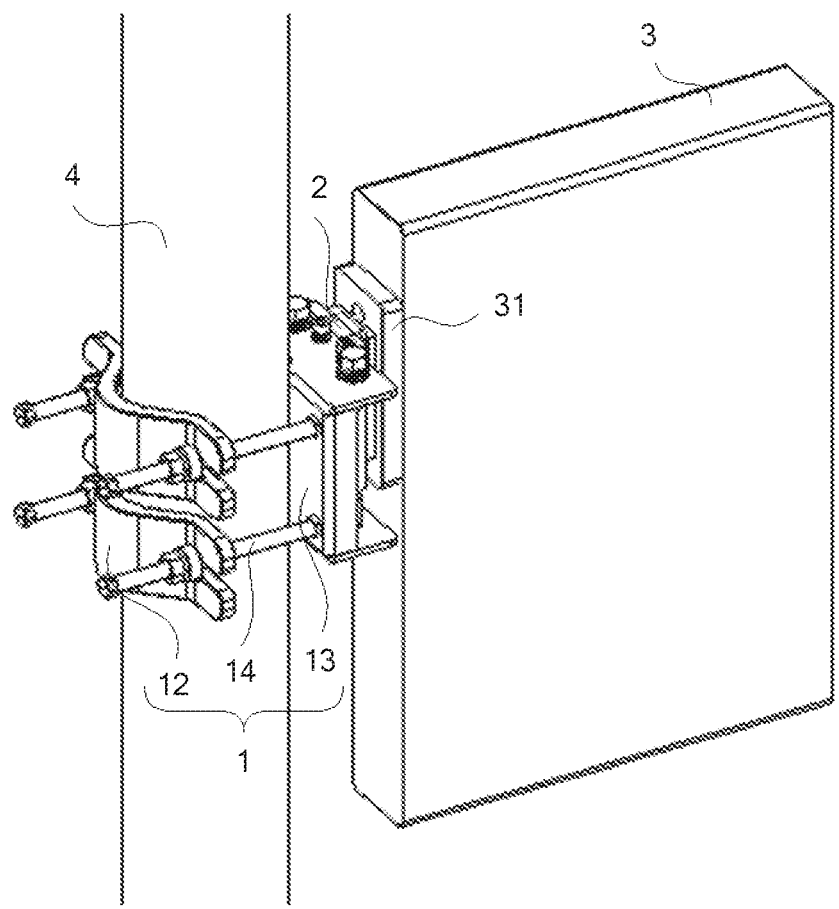
FIG. 2 is a three-dimensional diagram of jointing between an assembled support for installing a communications device and a communications device according to an embodiment of the present invention.

As shown in FIG. 2, to facilitate jointing between the communications device 3 and the assembled fastener 2, a jointing structure is further disposed on the communications device 3. A mating portion 221 of one of the assembled fastener 2 and the communications device 3 is inserted into an insertion slot 23 from an open end 232 of the insertion slot 23 of the other one. The mating portion abuts against two oppositely disposed side walls 231 and flanges 233 after an insertion block 22 is inserted into the insertion slot 23, to prevent the insertion block 22 from sliding out of the insertion slot 23. The communications device 3 is jointed to the assembled fastener 2 by inserting the insertion block 22 into the insertion slot 23, thereby simplifying a connection process between the communications device 3 and the assembled fastener 2, and improving assembling efficiency of the worker.

To ensure that the mating portion 221 inserted into the insertion slot 23 can abut against the side walls 231 of the insertion slot 23, a width of the mating portion 221 from a first end to a second end in a direction of insertion into the insertion slot 23 gradually decreases. After the insertion block 22 is inserted into the insertion slot 23, the first end is disposed close to the open end 232 of the insertion slot 23, and a width of a most narrow part of the insertion slot 23 is less than a width of a widest part of the mating portion 221 inserted into the insertion slot 23.

As shown in FIG. 3 to FIG. 6, a distance between the two oppositely disposed side walls 231 of the insertion slot 23 at the open end is greater than a distance between the two oppositely disposed side walls 231 at the other end, so that the insertion block 22 can be more easily inserted into the insertion slot 23. When the distance between the two oppositely disposed side walls 231 of the insertion slot 23 at the open end is relatively large, that is, a width of the insertion slot 23 at the open end 232 is relatively large, the insertion block 22 can be more easily inserted into the insertion slot 23. When the distance between the two oppositely disposed side walls 231 at the other end that is away from the open end 232 is relatively small, that is, a width of the insertion slot 23 at the other end in the extension direction of the insertion slot 23 is relatively small, the insertion block 22 inserted into the insertion slot 23 can abut against the side walls of the insertion slot 23, and a contact area between the insertion slot 23 and the insertion block 22 increases, so that the jointing is more stable.

Optionally, the open end 232 of the insertion slot 23 passes through the under face 25. The two oppositely disposed side walls 231 of the insertion slot 23 form the open end 232 at an end in the extension direction of the insertion slot 23, and the other end passes through the under face 25. If the two oppositely disposed side walls 231 of the insertion slot 23 form a closed end at the other end in the extension direction of the insertion slot 23, a closed structure may be disposed on the under face 25. In this case, after the insertion block 22 is inserted into the insertion slot 23, a bottom of the insertion block 22 abuts against the closed structure, to prevent the insertion block 22 from sliding out from the bottom end of the insertion slot 23.

Optionally, the bottom end of the insertion slot 23 in the extension direction of the insertion slot 23 is an opening. After the bottom end of the insertion slot 23 in the extension direction of the insertion slot 23 is disposed as an opening, if the bottom end and the open end 232 that are of the insertion slot 23 are disposed to be not communicated, when inserting the insertion block 22 into the insertion slot 23, the worker may insert the insertion block 22 from either end of the insertion slot 23, and the insertion block 22 does not slide out from the other end of the insertion slot 23.

Figure 11:
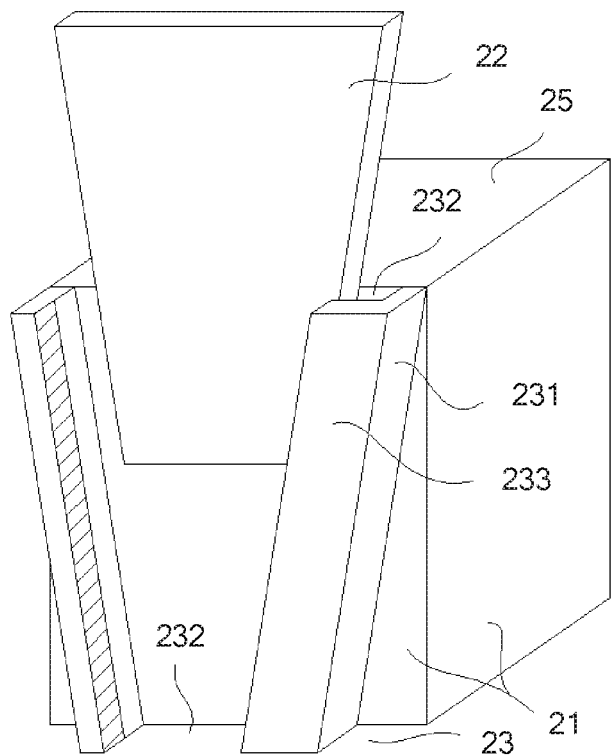
FIG. 11 is a schematic assembling diagram when an assembled fastener of an assembled support for installing a communications device includes an insertion block and an insertion slot, and both ends of the insertion slot are open ends according to an embodiment of the present invention.

Optionally, as shown in FIG. 11, the bottom end of the insertion slot 23 in the extension direction of the insertion slot 23 is an opening and passes through the under face 25. In this case, both ends of the two oppositely disposed side walls 231 in the extension direction of the insertion slot 23 are open ends 232. In this case, when the insertion block 22 is inserted into the insertion slot 23, insertion between the insertion slot 23 and the insertion block 22 may be implemented by means of coordination without flipping over an assembled fastener 2 on which the insertion slot 23 is disposed, and the insertion is relatively quick and convenient.

It should be noted that the insertion slot 23 may further be disposed as a structure in which one end is open and the other end is closed. As shown in FIG. 8, an end of the two oppositely disposed side walls 231 in the extension direction of the insertion slot 23 is the open end 232, and the other end is a closed end 234. After an end of the insertion slot 23 is disposed as the closed end 234, and the insertion block 22 is inserted into the insertion slot 23, the mating portion 221 may abut against the closed end 234 even if a maximum width of the mating portion 221 is less than a minimum width of the insertion slot 23, thereby avoiding the insertion block 22 from sliding out of the insertion slot 23.

Figure 3:
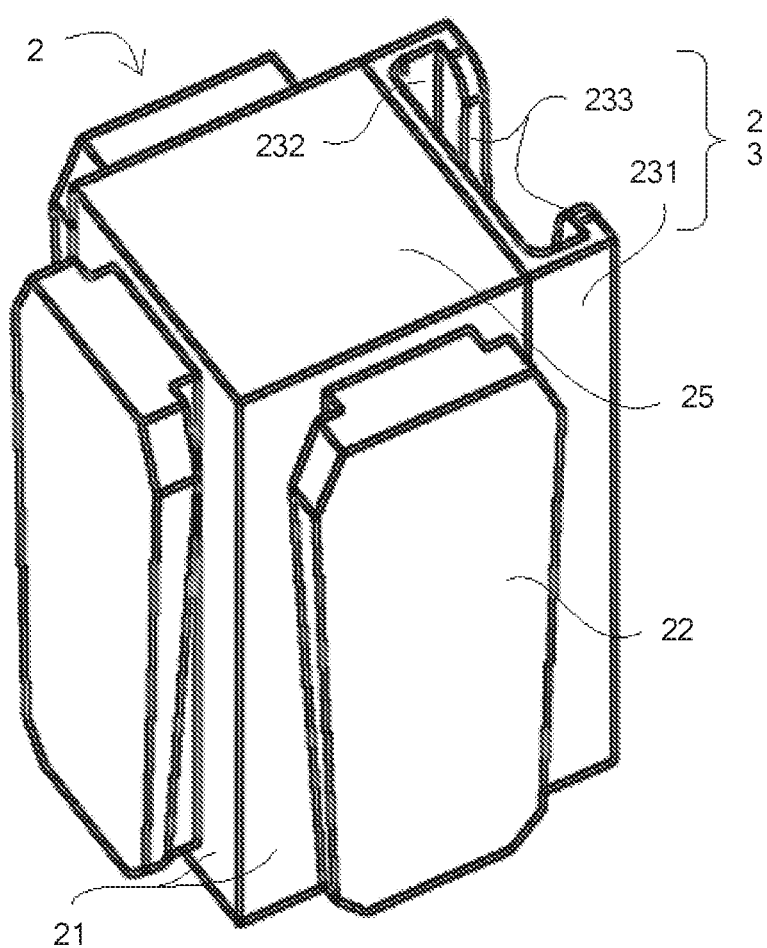
FIG. 3 is a three-dimensional diagram of a first implementation of an assembled fastener of an assembled support for installing a communications device according to an embodiment of the present invention.
Figure 4:
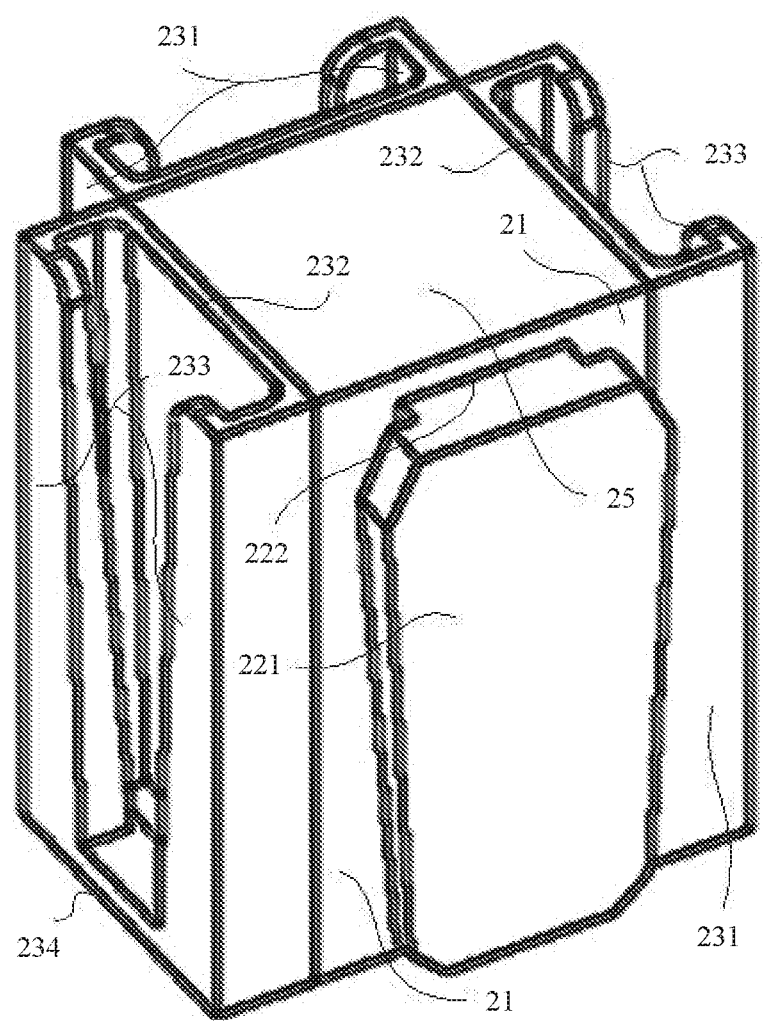
FIG. 4 is a three-dimensional diagram of a second implementation of an assembled fastener of an assembled support for installing a communications device according to an embodiment of the present invention.

When multiple identical assembled fasteners are used for jointing by means of insertion, an open end 232 of an insertion slot 23 on an assembled fastener 2 that is jointed needs to point upward, so that the assembled fastener 2 can be jointed to a next assembled fastener 2. In addition, a second end that has a relatively small width and that is of a mating portion 221 of an insertion block 22 on the assembled fastener 2 that is jointed needs to point upward, so that the assembled fastener 2 can be assembled with another assembled fastener 2. Therefore, to ensure that the insertion block 22 can be successfully inserted into the insertion slot 23 during the jointing, as shown in FIG. 3 and FIG. 4, at least one insertion block 22 and at least one insertion slot 23 are disposed on a side face 21 of each assembled fastener 2. On a same assembled fastener 2, a width of the mating portion 221 from a first end to a second end in a direction of insertion into the insertion slot 23 gradually decreases, the first end is disposed close to the open end 232 of the insertion slot 23, and a minimum width of the insertion slot 23 is less than a maximum width of the mating portion 221 inserted into the insertion slot 23. On a same assembled fastener 2, the first end that is of the mating portion 221 and that has a relatively large width is disposed close to the open end 232 of the insertion slot 23. When two identical assembled fasteners 2 are being jointed, the second end that is of the mating portion 221 and that has a relatively small width is inserted from the open end 232 of the insertion slot 23. After the insertion block 22 is completely inserted into the insertion slot 23, a first end of the insertion block 22 is close to the open end 232 of the insertion slot 23. In this case, first ends of all insertion blocks 22 on a formed assembled fastener group are all disposed close to the open end 232 of the insertion slot 23, so that an additional assembled fastener can be continuously jointed, and multiple assembled fasteners 2 are jointed together. Therefore, multiple communications devices 3 are jointed together.

Specifically, the first end is an upper end of the mating portion 221, the second end is a lower end of the mating portion 221, and the insertion block 22 is inserted into the insertion slot 23 in a down-to-up direction. When the insertion block 22 is being inserted into the insertion slot 23, the lower end that is of the mating portion 221 and that has a relatively small width is first inserted into the insertion slot 23 from the open end 232 of the insertion slot 23. After the insertion block 22 is completely inserted into the insertion slot 23, the upper end of the mating portion 221 is close to the open end 232 of the insertion slot 23.

Optionally, as shown in FIG. 3 and FIG. 4, the mating portion 221 is disposed as a trapezoidal plate, and a bottom of the trapezoidal plate is the first end of the mating portion 221. A width of the trapezoidal plate gradually decreases from the bottom of the trapezoidal plate to a top of the trapezoidal plate, the bottom of the trapezoidal plate is the first end of the mating portion 221, and the top of the trapezoidal plate is the second end of the mating portion 221. Because a width of the bottom of the trapezoidal plate is relatively small, the bottom of the trapezoidal plate may be relatively easily inserted from the open end 232 of the insertion slot 23. After the trapezoidal plate is completely inserted into the insertion slot 23, the bottom of the trapezoidal plate is close to the open end 232 of the insertion slot 23. A structure of the trapezoidal plate is simple, so that difficulty in mold making is low, and production difficulty and production costs are low.

Figure 6:
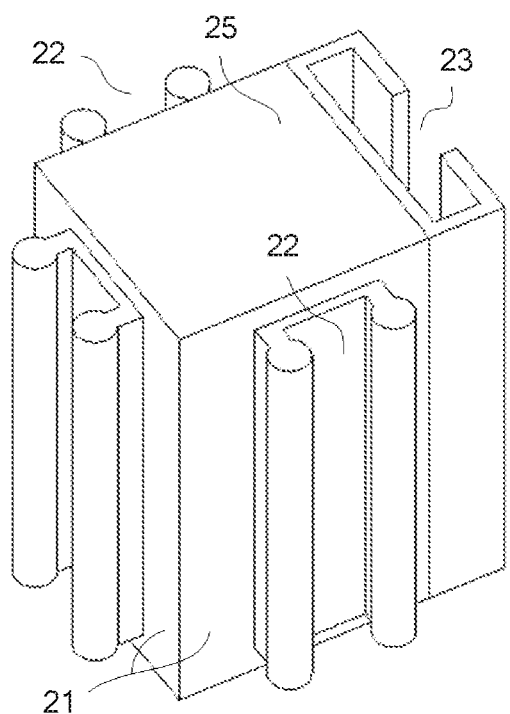
FIG. 6 is a schematic structural diagram of an insertion block that is of an assembled fastener of an assembled support for installing a communications device and that includes a cylindrical connection portion according to an embodiment of the present invention.

Optionally, as shown in FIG. 6, a width of the mating portion is uniform. After the insertion block 22 with such a structure is inserted into the insertion slot 23 by means of coordination, a contact area between the mating portion 221 of the insertion block 22 and each flange 233 of the insertion slot 23 is relatively large. After the communications device 3 is installed on the assembled fastener 2, there is a relatively high pressure on a contact face between each paired mating portion 221 of an insertion block 22 and flange 233 of an insertion slot 23 that are used for insertion by means of coordination. When the contact area is relatively large, a pressure on a unit area of the contact area is relatively low, thereby ensuring strength of the insertion block 22 after insertion.

Specifically, as shown in FIG. 6, the mating portion 221 includes two cylindrical connection portions, and an axis of a cylindrical connection portion is parallel to an extension direction of the insertion block 22. After the insertion block 22 with such a structure is inserted into the insertion slot 23, a surface of the cylindrical connection portion and each flange 233 of the insertion slot 23 are in contact, to prevent the insertion block 22 from sliding out of the insertion slot 23. In addition, because the axis of the cylindrical connection portion is parallel to the extension direction of the insertion block 22, the cylindrical connection portion has a symmetrical structure. Therefore, a mold structure is simple, and production difficulty is low.

When multiple assembled fasteners 2 are being jointed, identical assembled fasteners 2 may be used for jointing. Because an assembled fastener 2 includes multiple side faces 21, an insertion block 22 and an insertion slot 23 may be disposed on the multiple side faces of the assembled fastener 2. For example, as shown in FIG. 3, a jointing structure on one side face 21 of the assembled fastener 2 is an insertion slot 23, and jointing structures on the remaining side faces 21 are insertion blocks 22. When multiple identical assembled fasteners 2 with such a structure are used for jointing, the jointing can be completed by correspondingly inserting an insertion block 22 of one assembled fastener 2 into an insertion slot of another assembled fastener 2. A jointing speed is relatively high, so that quick jointing can be implemented.

Specifically, as shown in FIG. 3 and FIG. 7, the assembled fastener 2 has a regular quadrangular structure and includes four side faces 21. An insertion slot 23 is disposed on one side face, and an insertion block 22 is disposed on each of the remaining three side faces. When multiple assembled fasteners are used for jointing, as shown in the figures, insertion slots 23 of two assembled fasteners 2 are first put together, and open ends 232 of the two insertion slots 23 point downward. Then, the two assembled fasteners 2 are connected to the mounting bracket 1. In this case, second ends that are of mating portions 221 of insertion blocks 22 on other side faces of the two assembled fasteners 2 and that are of relatively small widths point upward. When another assembled fastener 2 is being assembled, assembling of the assembled fastener 2 can be completed simply by pointing an open end 232 of an insertion slot 23 of the assembled fastener 2 downward, and sleeving the insertion slot 23 in an up-to-down direction onto an insertion block 22 that is on a left/right side face of an assembled fastener 2 that is connected to the mounting bracket 1. Second ends that are of mating portions 221 of insertion blocks 22 on all jointed assembled fasteners 2 and that are of relatively small widths point upward. In addition, the multiple assembled fasteners 2 are jointed into a line to form the assembled support, and then the multiple communications devices 3 are connected to the assembled support, so as to implement assembling of the multiple communications devices 3.

In the foregoing jointing solution, to ensure reliable connection between the assembled fastener 2 and the mounting bracket 1, the assembled fastener 2 and the mounting bracket 1 may be connected to each other by using a fastener receiving slot 11. As shown in FIG. 7, the mounting bracket 1 may be a fastener receiving slot 11 whose rabbet is disposed to point to the assembled fastener 2. The two assembled fasteners 2 are installed in the fastener receiving slot 11 side by side, so as to avoid detachment between the two assembled fasteners 2 and the mounting bracket 1, thereby ensuring stability of jointed communications devices. In addition, a tapped hole 111 is disposed on an upper end wall and/or a bottom end wall of the fastener receiving slot 11, so as to avoid detachment between the assembled fastener 2 and the fastener receiving slot 11. After the assembled fastener 2 is installed in the fastener receiving slot 11, the tapped hole 111 is corresponding to a top face and/or a bottom face of the assembled fastener 2. In this case, the set screw 112 disposed in the tapped hole 111 can be screwed, so that a top of a set screw 112 abuts against the top face and/or the bottom face of the assembled fastener 2, and the assembled fastener 2 is firmly fastened in the fastener receiving slot 11.

Figure 10:
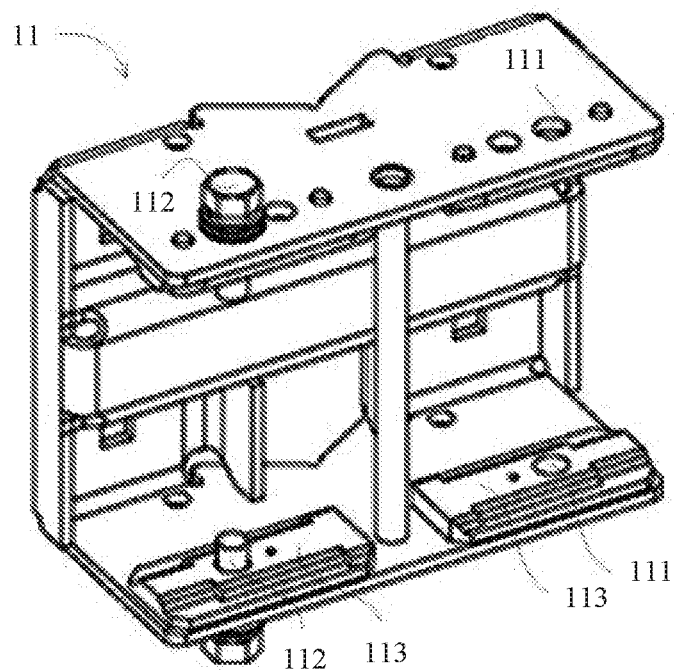
FIG. 10 is a schematic structural diagram of connection that is between a mounting bracket and an assembled fastener on an assembled support for installing a communications device and that is implemented by means of coordination between a sliding slot and a protrusion according to an embodiment of the present invention.

To ensure that the assembled fastener 2 can be quickly and accurately positioned in the fastener receiving slot 11, as shown in FIG. 10, a protrusion 113 whose extension direction is the same as an extension direction of the fastener receiving slot 11 is disposed on an inner side wall of the fastener receiving slot 11, and a sliding slot (not shown in the figure) that matches the protrusion 113 is disposed on a position that is corresponding to the protrusion 113 and that is on the top face and/or the bottom face of the assembled fastener 2. Because the extension direction of the protrusion 113 is the same as the extension direction of the fastener receiving slot 11, and the sliding slot is disposed corresponding to the protrusion 113, after the protrusion 113 is sleeved onto the sliding slot by means of coordination, the protrusion 113 can slide only in an extension direction of the sliding slot. The sliding slot can prevent the protrusion 113 from moving in a direction perpendicular to the extension direction of the sliding slot. When the worker installs the assembled fastener 2 in the fastener receiving slot 11, the worker may align a top of the sliding slot on the assembled fastener 2 with a top of a side of the protrusion 113, slide the assembled fastener 2 from a side of the fastener receiving slot 11 in the extension direction of the sliding slot, and then slightly adjust a position of the assembled fastener 2 in the extension direction of the sliding slot, so as to determine an installation position of the assembled fastener 2. Therefore, the assembled fastener 2 can be quickly and accurately installed in the fastener receiving slot 11. Then, the set screw 112 is screwed, so that the top of the set screw 112 abuts against the top face and/or the bottom face of the assembled fastener 2.

It should be noted that the sliding slot may further be disposed on the top face and/or the bottom face of the assembled fastener 2; and then the protrusion 113 that matches the sliding slot is correspondingly disposed on an upper end wall and/or a bottom end wall of the fastener receiving slot 11. During installation, the sliding slot is correspondingly sleeved onto the protrusion 113, and then the set screw 112 is screwed. In this way, the assembled fastener 2 may be fastened to the fastener receiving slot 11.

For example, as shown in FIG. 4, when multiple identical assembled fasteners 2 are used for jointing, the assembled fastener 2 may use a structure in which a jointing structure on one side face 21 is an insertion block 22, and jointing structures on the remaining side faces 21 are insertion slots 23. When multiple identical assembled fasteners with such a structure are used for jointing, the jointing can be completed by correspondingly inserting an insertion block 22 of one assembled fastener 2 into an insertion slot 23 of another assembled fastener 2. A jointing speed is relatively high, so that quick jointing can be implemented.

Specifically, as shown in FIG. 4 and FIG. 8, the assembled fastener 2 has a regular quadrangular structure and includes four side faces 21. An insertion block 22 is disposed on one side face, and an insertion slot 23 is disposed on each of the remaining three side faces. When multiple assembled fasteners are used for jointing, an assembled fastener 2 is first connected to the mounting bracket 1, an insertion block 22 on the assembled fastener 2 is disposed close to the mounting bracket 1, and an open end 232 of the insertion slot 23 points upward. Then, an insertion block 22 on another assembled fastener 2 is correspondingly inserted into an insertion slot 23 on a left/right side face of the assembled fastener 2 fastened to the mounting bracket 1, so as to complete assembling of assembled fasteners 2. After the jointing is completed, all open ends 232 of insertion slots 23 on all the assembled fasteners 2 point upward, and the multiple assembled fasteners 2 are jointed into a line to form the assembled support. In this case, the communications device 3 is jointed to the jointing structure of the assembled fastener 2, so that the multiple communications devices 3 are connected to the assembled support, and assembling of the multiple communications devices 3 is implemented.

In the foregoing jointing solution, as shown in FIG. 8, a connection structure that is on the mounting bracket 1 and that is configured to connect to the assembled fastener 2 may be an insertion slot 23 whose open end 232 points upward. The insertion block 22 on the assembled fastener 2 is inserted into the insertion slot 23 on the mounting bracket 1 by means of coordination, so that the assembled fastener 2 is fastened to the mounting bracket 1. In this case, all open ends 232 of the three insertion slots 23 of the assembled fastener 2 connected to the mounting bracket 1 point upward.

Optionally, a connection portion 12 that is of the mounting bracket 1 and that is configured to connect to the assembled fastener 2 may be a fastener receiving slot 11. The assembled fastener 2 is fastened in the fastener receiving slot 11. During installation, it needs to be ensured that the insertion block 22 on the assembled fastener 2 is disposed close to a slot bottom of the fastener receiving slot 11, and all the open ends 232 of the three insertion slots 23 of the assembled fastener 2 point upward.

Figure 5:
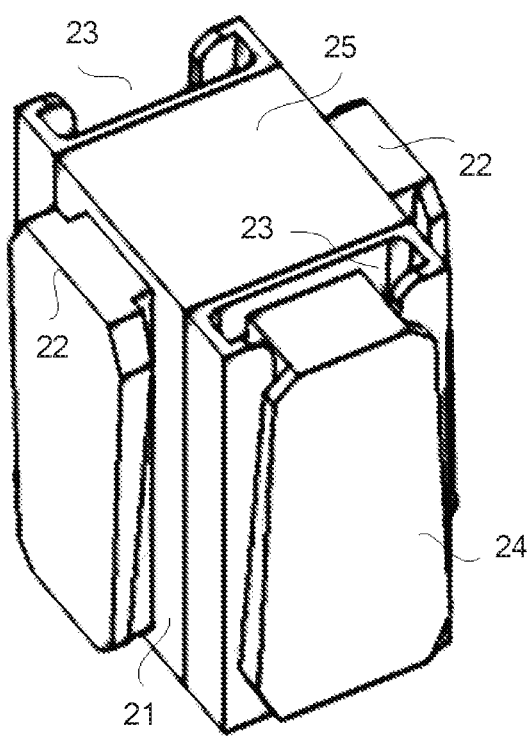
FIG. 5 is a three-dimensional diagram of a third implementation of an assembled fastener of an assembled support for installing a communications device according to an embodiment of the present invention.
Figure 9:
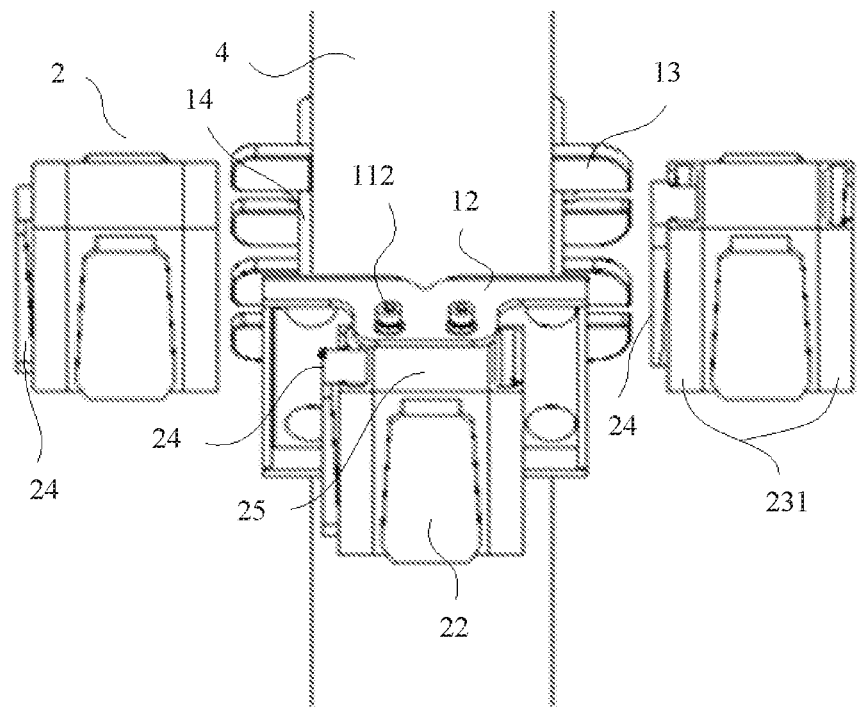
FIG. 9 is a schematic diagram of a jointing solution of a third implementation of an assembled fastener of an assembled support for installing a communications device according to an embodiment of the present invention.

For example, as shown in FIG. 5 and FIG. 9, when multiple identical assembled fasteners are used for jointing, jointing structures on two side faces 21 of the assembled fastener 2 are insertion slots 23, jointing structures on the remaining side faces are insertion blocks 22, a transfer block 24 is detachably connected to an insertion slot 23, and a part that is outside the insertion slot 23 and that is of the transfer block 24 forms the insertion block 22. When multiple identical assembled fasteners 2 with such a structure are used for jointing, the jointing can be completed by inserting an insertion block 22 of one assembled fastener 2 into an insertion slot 23 in which no transfer block 24 is disposed. In addition, an orientation of the transfer block 24 on the assembled fastener 2 may be changed according to an actual assembling requirement, so that a first end of a mating portion 221 of the insertion block 22 formed on the transfer block 24 is disposed close to or away from an open end 232 of the insertion slot 23, to ensure that another assembled fastener 2 can be continuously jointed to an assembled fastener 2 that is jointed to the transfer block 22.

Specifically, as shown in FIG. 9, the assembled fastener 2 has a regular quadrangular structure and includes four side faces 21. An insertion slot 23 is separately disposed on two opposite side faces, an insertion block 22 is separately disposed on the other two opposite side faces, and a transfer block 24 is detachably connected to an insertion slot 23. When multiple assembled fasteners are used for jointing, an assembled fastener 2 is first connected to the mounting bracket 1, an insertion block 22 on the assembled fastener 2 is disposed close to the mounting bracket 1, and an open end 232 of the insertion slot 23 points upward. Therefore, the insertion slot 23 on which the transfer block 24 is disposed is on a left side or a right side of the assembled fastener 2, and a first end of an insertion block 22 formed on the transfer block 24 on a side away from the assembled fastener 2 is disposed to point upward. Then, an insertion block 22 on an assembled fastener 2 is correspondingly inserted into an empty insertion slot 23 of the assembled fastener 2 fastened to the mounting bracket. In this case, because the first end of the insertion block 22 formed on the transfer block 24 is disposed to point upward, that is, the assembled fastener 2 cannot be jointed to another assembled fastener 2, the transfer block 24 needs to be first removed, and then reversed and re-installed in an insertion slot 23 of the assembled fastener 2 fastened to the mounting bracket 1. Therefore, a second end of the insertion block 22 formed on the transfer block 24 is disposed to point upward, so that an insertion slot 23 of another assembled fastener 2 can be sleeved onto the insertion block 22 formed on the transfer block 24. Multiple assembled fasteners 2 may be jointed together by repeating the foregoing steps. The multiple assembled fasteners 2 are jointed into a line to form the assembled support, and then the multiple communications devices 3 are connected to the assembled support, so as to implement assembling of the multiple communications devices 3.

As shown in FIG. 3 to FIG. 6, the assembled fastener 2 has a regular quadrangular structure, so as to ensure that all the jointed communications devices 3 are in a same plane. During jointing, the assembled fastener 2 may be rotated according to an actual jointing requirement, so as to ensure that two neighboring assembled fasteners 2 are jointed. After the assembled fastener 2 is disposed as a regular quadrangular structure, whether the assembled fastener 2 is flipped upward or downward or rotated leftward or rightward, all surfaces on sides away from the mounting bracket 1 are in a same plane after the two neighboring assembled fasteners 2 are jointed together. In this way, after the communications device 3 is assembled on the assembled fastener 2, all surfaces that are of any two neighboring communications devices 3 and that are on sides away from the mounting bracket 1 are in a same plane. Therefore, a communications device group formed after the assembling is relatively trim.

During jointing of an assembled fastener 2 with a regular quadrangular structure, jointing structures on side faces 21 of the assembled fastener 2 may also be disposed as two insertion blocks 22 and two insertion slots 23. For example, jointing structures disposed on two neighboring side faces of the assembled fastener 2 are insertion slots 23, and jointing structures disposed on the other two side faces are insertion blocks 22. During jointing, the jointing can be completed to form the assembled support simply by correspondingly inserting an insertion block 22 on one assembled fastener 2 into an insertion slot 23 of another assembled fastener 2. Then, the communications device 3 is connected to the formed assembled support, so as to implement a structure for jointing multiple communications devices 3.

When the jointing structures on the side faces 21 of the assembled fastener 2 are two insertion blocks 22 and two insertion slots 23, jointing structures on two oppositely disposed side faces of the assembled fastener 2 may be disposed as insertion slots 23, and jointing structures on the other two oppositely disposed side faces are disposed as insertion blocks 22. During jointing, the jointing can be completed to form the assembled support simply by correspondingly inserting an insertion block 22 on one assembled fastener 2 into an insertion slot 23 of another assembled fastener 2. Then, the communications device 3 is connected to the formed assembled support, so as to implement a structure for jointing multiple communications devices 3.

When a jointing structure is used to joint the communications devices 3 to the assembled fastener 2, as shown in FIG. 2, a fastening member 31 is disposed on the to-be-installed communications device 3, a jointing structure is disposed on a side that is of the fastening member 31 and that is away from the to-be-installed communications device 3, and the jointing structure on the fastening member 31 is capable of coordinating with the jointing structure on the assembled fastener 2 for jointing. The fastening member 31 is a connector used to connect the assembled fastener 2 and the communications devices 3. When the to-be-installed communications device 3 needs to be installed on the assembled fastener 2, if a jointing structure on a side face of the assembled fastener 2 is an insertion block 22, a fastening member 31 whose jointing structure is an insertion slot 23 may be connected to the to-be-installed communications device 3. When the to-be-installed communications device 3 is being jointed to the assembled fastener 2, jointing can be completed simply by ensuring that an open end 232 of the insertion slot 23 on the fastening member 31 points downward, and sleeving the insertion slot 23 onto the fastening member 31 on the insertion block 22. Likewise, when a jointing structure on a side face of the assembled fastener 2 is an insertion slot 23, and a jointing structure on a front side of the fastening member 31 on the to-be-installed communications device 3 is an insertion block 22, during the jointing, it only needs to correspondingly insert the insertion block 22 on the fastening member 31 into the insertion slot 23 on the side face of the assembled fastener 2.

As shown in FIG. 8 and FIG. 9, when the communications device installation position is on a pole 4, the mounting bracket 1 includes a primary fastener 12 and a secondary fastener 13 that are disposed on two sides of the pole. The primary fastener 12 and the secondary fastener 13 are connected to each other by using a stay bolt 14, so that the primary fastener 12 and the secondary fastener 13 are fastened to the pole 4. Optionally, a pole plane is disposed on the primary fastener 12 for coordinating with an outer surface of the pole 4, so that a contact area between the primary fastener 12 and the outer surface of the pole 4 increases, and the mounting bracket 1 and the pole 4 are connected more tightly. It should be noted that a pole plane may further be disposed on the secondary fastener 13 to increase a contact area between the secondary fastener 13 and the outer surface of the pole 4, so that the mounting bracket 1 and the pole 4 are connected more tightly.

When the communications device installation position is on an installation wall, a bolt hole is disposed on the mounting bracket 1, and a bolt passes through the bolt hole to fasten the mounting bracket 1 to the installation wall. Preferably, an expansion bolt is used to install the mounting bracket 1 on the installation wall. The expansion bolt is easy to install, and connection strength is high, thereby ensuring reliable connection between the mounting bracket 1 and the installation wall.

An embodiment of the present invention further provides a structure combining a communications device and an assembled support. As shown in FIG. 2, the structure includes the foregoing assembled support and multiple communications devices 3 jointed to the assembled support. The assembled support is installed on a communications device installation position by using a mounting bracket 1. Multiple communications devices 3 are jointed to the assembled support, thereby implementing a structure for jointing multiple communications devices 3, and facilitating management and maintenance by a worker.

Because the assembled support used in the combined structure in this embodiment is the same as the assembled support provided in the embodiment of the assembled support, both can resolve a same technical problem and achieve a same expected effect.

For ease of management, multiple assembled supports may be arranged in a height direction of the communications device installation position, and multiple communications devices 3 are jointed to each assembled support. When multiple communications devices 3 are jointed, centralized installation of all communications device groups facilitates management and maintenance by a worker.

There are two jointing structures configured to joint with another assembled fastener 2 on each assembled fastener 2, the two jointing structures are respectively on two opposite side faces of the assembled fastener 2, and multiple assembled fasteners 2 are jointed into a line in a horizontal direction by means of coordination, so that the multiple communications devices 3 can be seamlessly jointed into a line. In this case, the multiple communications devices 3 jointed to the assembled fastener 2 are jointed into a line in a horizontal direction by means of coordination. Therefore, the multiple communications devices 3 are seamlessly jointed into a line, thereby facilitating management and maintenance by a technical personnel.

Figure 12:
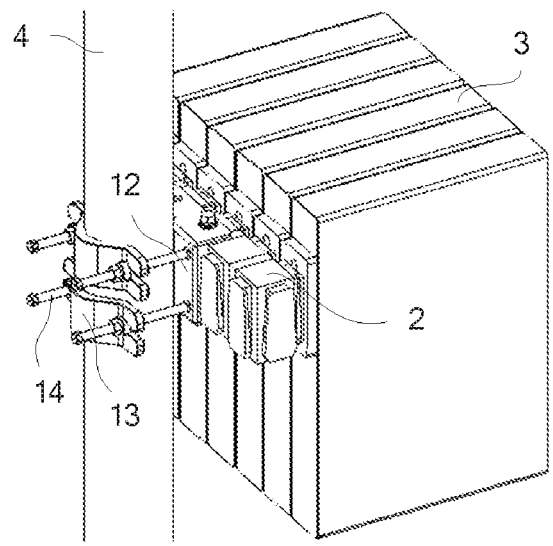
FIG. 12 is a schematic diagram of a first assembling manner of a structure combining a communications device and an assembled support according to an embodiment of the present invention.

As shown in FIG. 12, to ensure that a communications device group formed by jointing the multiple communications devices 3 is trim in appearance, all the multiple communications devices 3 are jointed to a side that is of the assembled fastener 2 and that is away from the mounting bracket 1, and end faces on sides that are of the multiple communications devices 3 and that are away from the mounting bracket 1 are flush with one another. The communications device group formed by jointing the multiple communications devices 3 only to the side that is of the assembled fastener 2 and that is away from the mounting bracket 1 has a cubic structure, and is trim and neat.

Figure 13:
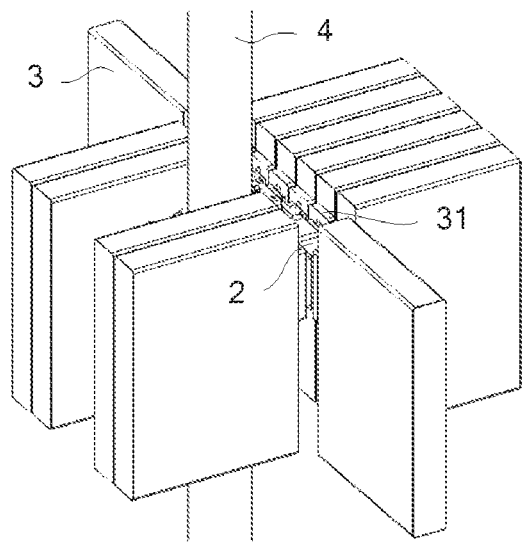
FIG. 13 is a schematic diagram of a second assembling manner of a structure combining a communications device and an assembled support according to an embodiment of the present invention.

A possibly large quantity of communications devices 3 are jointed to a same assembled support, so as to fully use jointing structures on an assembled fastener 2. As shown in FIG. 13, a communications device 3 is jointed to each jointing structure that is on the assembled fastener 2 and that is neither jointed to another assembled fastener 2 nor connected to the mounting bracket 1.

What is claimed is:

1. An assembled support for installing a communications device, the assembled support comprising:
    a mounting bracket and multiple assembled fasteners, wherein:
    at least one of the assembled fasteners is connected to the mounting bracket, wherein the at least one assembled fastener has a prismatic structure and is disposed in a vertical direction, wherein the at least one assembled fastener comprises two under faces and multiple side faces, wherein a jointing structure is disposed on at least one side face of the assembled fastener, wherein at least one side face of the assembled fastener is used to install the communications device, wherein the multiple assembled fasteners are jointed together by using the jointing structure, and wherein the jointing structure is an insertion block or an insertion slot.

2. The assembled support for installing a communications device according to claim 1, wherein a jointing structure is disposed on a side face used to install the communications device, and wherein the jointing structure is configured to install the communications device.

3. The assembled support for installing a communications device according to claim 2, wherein there are two assembled fasteners, wherein the two assembled fasteners are jointed together by using a jointing structure on a side face, and wherein jointing structures on the remaining side faces are configured to install the communications device.

4. The assembled support for installing a communications device according to claim 2, wherein there are three assembled fasteners, wherein two neighboring assembled fasteners are jointed together by using a jointing structure on a side face, and wherein jointing structures on the remaining side faces are configured to install the communications device.

5. The assembled support for installing a communications device according to claim 2, wherein:
    the insertion block and the insertion slot are disposed to extend in a same direction;
    the insertion slot comprises two side walls oppositely disposed in an extension direction of the insertion slot, wherein the two side walls form an open end and a bottom end respectively on two ends in the extension direction of the insertion slot, wherein the insertion slot further comprises flanges, wherein the flanges are side edges extending outward from the two oppositely disposed side walls in the extension direction, and wherein the flanges extend into the insertion slot; and the insertion block comprises a mating portion and a connection plate connected between the assembled fastener and the mating portion, wherein both sides of the mating portion in a width direction protrude beyond the connection plate.

6. The assembled support for installing a communications device according to claim 5, wherein a mating portion of one of two neighboring assembled fasteners is inserted into an insertion slot of the other assembled fastener from an open end of the insertion slot, and wherein the mating portion abuts against two oppositely disposed side walls and flanges after an insertion block is inserted into the insertion slot to prevent the insertion block from sliding out of the insertion slot.

7. The assembled support for installing a communications device according to claim 5, wherein a jointing structure is disposed on the communications device, wherein a mating portion of either of the assembled fastener and the communications device is inserted into an insertion slot from an open end of the insertion slot of the other one, and wherein the mating portion abuts against two oppositely disposed side walls and flanges after an insertion block is inserted into the insertion slot to prevent the insertion block from sliding out of the insertion slot.

8. The assembled support for installing a communications device according to claim 5, wherein a width of the mating portion from a first end to a second end in a direction of insertion into the insertion slot gradually decreases after the insertion block is inserted into the insertion slot, wherein the first end is disposed close to the open end of the insertion slot, and wherein a width of a most narrow part of the insertion slot is less than a width of a widest part of the mating portion inserted into the insertion slot.

9. The assembled support for installing a communications device according to claim 5, wherein a distance between the two oppositely disposed side walls of the insertion slot at the open end is greater than a distance between the two oppositely disposed side walls at the other end.

10. The assembled support for installing a communications device according to claim 5, wherein the open end of the insertion slot passes through the under face.

11. The assembled support for installing a communications device according to claim 5, wherein the bottom end of the insertion slot in the extension direction of the insertion slot is an opening.

12. The assembled support for installing a communications device according to claim 5, wherein the bottom end of the insertion slot in the extension direction of the insertion slot is an opening and passes through the under face.

13. The assembled support for installing a communications device according to claim 5, wherein an end of the two oppositely disposed side walls in the extension direction of the insertion slot is the open end, and wherein the other end is a closed end.

14. The assembled support for installing a communications device according to claim 5, wherein:

at least one insertion block and at least one insertion slot are disposed on a side face of each assembled fastener; and on a same assembled fastener, a width of the mating portion from a first end to a second end in a direction of insertion into the insertion slot gradually decreases, wherein the first end is disposed close to the open end of the insertion slot, and wherein a minimum width of the insertion slot is less than a maximum width of the mating portion inserted into the insertion slot.

15. The assembled support for installing a communications device according to claim 8, wherein the first end is an upper end of the mating portion, wherein the second end is a lower end of the mating portion, and wherein the insertion block is inserted into the insertion slot in a down-to-up direction.

16. The assembled support for installing a communications device according to claim 15, wherein the mating portion is a trapezoidal plate, and wherein a bottom of the trapezoidal plate is the first end of the insertion block.

17. The assembled support for installing a communications device according to claim 5, wherein the jointing structure on one side face of the assembled fastener is the insertion slot, and wherein the jointing structures on the remaining side faces are the insertion blocks.

18. The assembled support for installing a communications device according to claim 5, wherein the jointing structure on one side face of the assembled fastener is the insertion block, and wherein the jointing structures on the remaining side faces are the insertion slots.

19. The assembled support for installing a communications device according to claim 5, wherein the jointing structures on two side faces of the assembled fastener are the insertion slots, wherein the jointing structures on the remaining side faces are the insertion blocks, wherein a transfer block is detachably connected to one of the insertion slots, and wherein a part that is outside the insertion slot and that is of the transfer block forms the insertion block.

20. The assembled support for installing a communications device according to claim 2, wherein the assembled fastener has a regular quadrangular structure.

21. The assembled support for installing a communications device according to claim 20, wherein the jointing structures on two neighboring side faces of the assembled fastener are the insertion slots, and wherein the jointing structures on the other two side faces are the insertion blocks.

22. The assembled support for installing a communications device according to claim 20, wherein the jointing structures on two oppositely disposed side faces of the assembled fastener are the insertion slots, and wherein the jointing structures on the other two oppositely disposed side faces are the insertion blocks.

23. The assembled support for installing a communications device according to claim 20, wherein a fastening member is disposed on a to-be-installed communications device, wherein a jointing structure is disposed on a side that is of the fastening member and that is away from the to-be-installed communications device, and wherein the jointing structure on the fastening member is capable of coordinating with the jointing structure on the assembled fastener for jointing.

* * * * *